(12) United States Patent
Park et al.

(10) Patent No.: US 12,500,321 B2
(45) Date of Patent: Dec. 16, 2025

(54) WAVEGUIDE FILTER

(71) Applicant: KMW INC., Hwaseong-si (KR)

(72) Inventors: Nam Shin Park, Hwaseong-si (KR); Yeon Ho Shin, Yongin-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 18/603,218

(22) Filed: Mar. 13, 2024

(65) Prior Publication Data

US 2024/0222831 A1    Jul. 4, 2024

Related U.S. Application Data

(63) Continuation of application No. 17/369,967, filed on Jul. 8, 2021, now Pat. No. 11,955,680, which is a continuation of application No. PCT/KR2020/000174, filed on Jan. 6, 2020.

(30) Foreign Application Priority Data

Jan. 8, 2019  (KR) .................. 10-2019-0002388
Dec. 30, 2019  (KR) .................. 10-2019-0178270

(51) Int. Cl.
*H01P 1/20*    (2006.01)
*H01P 7/00*    (2006.01)

(52) U.S. Cl.
CPC . *H01P 1/20* (2013.01); *H01P 7/00* (2013.01)

(58) Field of Classification Search
CPC .... H01P 1/20; H01P 7/00; H01P 1/207; H01P 1/2002
See application file for complete search history.

(56) References Cited

U.S. PATENT DOCUMENTS

| | | |
|---|---|---|
| 6,559,740 B1 | 5/2003 | Schulz et al. |
| 9,437,909 B2 | 9/2016 | Vangala et al. |
| 2011/0279200 A1 | 11/2011 | Vangala |
| 2015/0123747 A1 | 5/2015 | Kaesser |
| 2016/0380322 A1 | 12/2016 | Rogozine et al. |
| 2018/0301781 A1 | 10/2018 | Peng et al. |

FOREIGN PATENT DOCUMENTS

| | | |
|---|---|---|
| CN | 1398014 A | 2/2003 |
| CN | 1419311 A | 5/2003 |
| CN | 1427501 A | 7/2003 |

(Continued)

OTHER PUBLICATIONS

Non-final Office Action mailed Jun. 22, 2023 for U.S. Appl. No. 17/369,967.

(Continued)

*Primary Examiner* — Andrea Lindgren Baltzell
*Assistant Examiner* — Kimberly E Glenn
(74) *Attorney, Agent, or Firm* — Insight Law Group, PLLC; Seung Lee

(57) ABSTRACT

The present invention relates to a waveguide filter having an enhanced property of a specific passband through cross coupling using a resonator, and can set cross coupling in a limited space by providing a notch post, simplify the complexity of a filter by allowing the properties or strength of the cross coupling to be changed according to the position or form thereof, and implement various filter performances.

20 Claims, 13 Drawing Sheets

(56) References Cited

FOREIGN PATENT DOCUMENTS

| | | |
|---|---|---|
| CN | 103618122 A | 3/2014 |
| CN | 104871364 A | 8/2015 |
| CN | 105244571 A | 1/2016 |
| CN | 106025468 A | 10/2016 |
| CN | 106898849 A | 6/2017 |
| CN | 106960994 A | 7/2017 |
| CN | 206864582 U | 1/2018 |
| CN | 206864583 U | 1/2018 |
| CN | 108550964 A | 9/2018 |
| CN | 108987863 A | 12/2018 |
| CN | 107534197 B | 1/2021 |
| JP | H08-330809 A | 12/1996 |
| JP | 2018-526949 A | 9/2018 |
| JP | 2018-538763 A | 12/2018 |
| KR | 10-2004-0043447 A | 5/2004 |
| KR | 10-0911859 B1 | 8/2009 |
| KR | 10-1191751 B1 | 10/2012 |
| KR | 10-1216910 B | 12/2012 |
| KR | 10-1216910 B1 | 12/2012 |
| KR | 10-2016-0015063 A | 2/2016 |
| KR | 20160015063 A * | 2/2016 |
| KR | 10-2018-0013311 A | 2/2018 |
| KR | 10-2018-0042190 A | 4/2018 |
| WO | 2015/079227 A1 | 6/2015 |
| WO | 2015/124949 A1 | 8/2015 |

OTHER PUBLICATIONS

Notice of Allowance mailed Dec. 2, 2023 for U.S. Appl. No. 17/369,967.

Extended European Search Report mailed on Jun. 27, 2024 from the European Patent Office for European Application No. 20737980.1.

Office Action mailed on Aug. 20, 2025 from Chinese Patent Office for Application No. 202310262439.0.

* cited by examiner

300

(a)    (b)

(a)

(b)

(a)

(b)

WAVEGUIDE FILTER

This application is a continuation of U.S. application Ser. No. 17/369,967, filed Jul. 8, 2021 (now pending), which is a continuation application of International Application No. PCT/KR2020/000174, filed Jan. 6, 2020, which claims the benefit of Korean Patent Application Nos. 10-2019-0002388, filed Jan. 8, 2019, and 10-2019-0178270, filed Dec. 30, 2019, in the Korean Intellectual Property Office, the disclosures of which are incorporated herein in their entirety by reference.

TECHNICAL FIELD

The present disclosure relates to a waveguide filter for an antenna, and more particularly, to a waveguide filter using cross coupling including resonators.

BACKGROUND ART

With a recent increase in the type of wireless communication service, a frequency environment becomes complicated. Since frequencies for wireless communication are limited, frequency resources need to be effectually applied by making wireless communication channels as close as possible.

However, signal interference occurs in an environment in which various wireless communication services are provided, and thus an antenna includes a bandfilter for a specific band in order to minimize signal interference between frequency resources that are adjacent to each other.

In general, a transmission zero (hereinafter referred to as a "notch") is essentially applied to improve attenuation characteristics of the bandfilter. This is implemented by applying cross coupling between resonant elements that are not adjacent to each other.

Among RF filters, a dielectric waveguide filter includes a resonator for adjusting a notch to a dielectric block, surroundings of which are covered with a conductor film. The resonator is designed to give resonance characteristics to an electromagnetic wave to restrict a specific frequency.

In this case, in general, when the cross coupling is formed across an even number of resonators, a symmetric left and right notch of a passband is obtained, and when the cross coupling is formed across an odd number of resonators, one notch is obtained on the left or right side depending on a coupling type.

The notches of this communication filter need to be very variously implemented according to performance of a communication system, but the performance of the communication system is restricted in implementing a filter suitable for characteristics of the communication system.

Accordingly, the filter needs to be differently set according to the communication system such that the notches can be implemented on the left and right sides of a specific passband in the antenna.

Especially, in implementing the notches on the left and right sides of the passband using one type of cross coupling, if the left side in left and right asymmetry is subjected to strong coupling but the right side is subjected to weak coupling, there is no alternative but to inevitably use a structure for two types of cross coupling. This implementation of the two types of cross coupling acts as many restrictions on the filter design, and particularly acts as a greater problem in a ceramic filter structure in which a structure added to implement the cross coupling is not easily inserted into the filter.

Further, to implement the two notches on the left or right side of the passband to satisfy desired characteristics, two types of cross coupling passing an odd number of resonators should be implemented, and thus there are many restrictions in design.

DISCLOSURE

Technical Problem

The present disclosure is directed to providing a waveguide filter, and more particularly, a waveguide filter having enhanced characteristics of a specific passband through cross coupling using resonators.

Technical Solution

TO achieve the objective, a waveguide filter according to the present disclosure includes: a housing configured to provide a plurality of resonance blocks; a plurality of resonators formed by resonator posts installed on the plurality of resonance blocks; partitions formed on boundaries of the plurality of resonance blocks and configured to divide the resonance blocks; and a notch post installed adjacent to the plurality of resonators and configured to form cross coupling between the plurality of resonators adjacent to each other. The notch post is subjected to a change in intensity of the cross coupling between the plurality of resonators depending on a position or a form thereof.

Further, the notch post may be configured such that characteristics of the cross coupling between the plurality of resonators are set to inductive coupling or capacitive coupling depending on distances from the resonator posts provided to the plurality of resonators.

Further, the notch post may be configured such that the set inductive coupling or capacitive coupling preformed between mutually neighboring resonators depending on the cross coupling is changed and set depending on a change in distances from the resonator posts provided to the plurality of resonators.

Further, the notch post may be located adjacent to at least four resonators.

Further, the notch post may be located adjacent to at least four resonators that form neighboring coupling in order, and may be located to form at least some of the resonance blocks divided by the plurality of partitions.

Further, the notch post may form three types of cross coupling with respect to the at least four resonators.

Further, the notch post may be installed adjacent to at least one of the plurality of resonators adjacent to each other, and increase intensity of the cross coupling for the at least one reactor.

Further, the notch post may form capacitive coupling between the at least one resonator installed adjacent to each other.

Further, the notch post may be formed on at least one of an upper or lower end face of the housing, and, when formed on the upper end face of the housing, be installed to protrude inward from the upper end face of the housing at a predetermined depth.

Further, the notch post may be formed on at least one of an upper or lower end face of the housing, and, when formed on the lower end face of the housing, be installed to protrude inward from the lower end face of the housing at a predetermined depth.

Further, the notch post may be configured such that, when formed on each of the upper and lower end faces of the housing, a spaced distance between a lower end of an upper end post formed on the upper end face of the housing and an upper end of a lower end post formed on the lower end face of the housing may be set to be equal to and more than a setting distance.

Further, the notch post may be configured such that a reciprocal proportion of the predetermined depth of the upper end post and the predetermined depth of the lower end post is adjusted in a state in which the spaced distance between the upper end post and the lower end post is kept equal to and more than the setting distance, and the intensity of the capacitive coupling or the inductive coupling which is set depending on the cross coupling may be adjusted.

Further, the notch post may be formed in a form of any one of a circular post, a trigonal post, a tetragonal post, and another N-gonal post.

Further, the notch post may have one portion formed in curve and have the other portion formed in a tetragonal post.

Further, the partitions may adjust the intensity of the cross coupling to neighboring resonators of the plurality of resonators according to positions thereof.

Further, the partitions may set sizes of the resonance blocks depending on positions thereof.

Advantageous Effects

In the waveguide filter according to the present disclosure configured as above, the filter can be easily designed by implementing a notch depending on characteristics of both sides of a specific passband through cross coupling, and characteristics of the filter can be improved.

The present disclosure can set cross coupling within a restricted space using a notch post.

The present disclosure can change characteristics of cross coupling through a change in position or form of a notch post and change characteristics of the filter.

The present disclosure can form a notch on a left or right side of a passband to desired characteristics through a change in position or form of a notch post.

The present disclosure can easily design a filter regardless of a type of dielectric of a waveguide filter in which ceramic or air is used as a dielectric.

The present disclosure can implement performance of various filters depending on position and form thereof by installing a notch post.

The present disclosure can simplify complexity of a filter, reduce manufacturing costs, and increase productivity.

LIST OF REFERENCE NUMERALS

100: Waveguide filter ①  to ⑥: Resonator
11 to 16: Resonance block 21: Input post
22: Output post 31 to 36: Resonator post

BEST MODE

The advantages and features of the present disclosure, and methods of accomplishing these will become obvious with reference to examples to be described below in detail along with the accompanying drawings. However, the present disclosure is not limited to the exemplary embodiments set forth below, and may be embodied in various other forms. Merely, these embodiments are configured to render the description of the present disclosure complete and to provide a complete understanding of the scope of the disclosure to those having ordinary skill in the art to which the present disclosure pertains, and the present disclosure will only be defined by the scope of the claims. The same reference sign throughout the specification indicates the same component.

Hereinafter, embodiments of the present disclosure will be described in detail with reference to the drawings.

Figure 1:
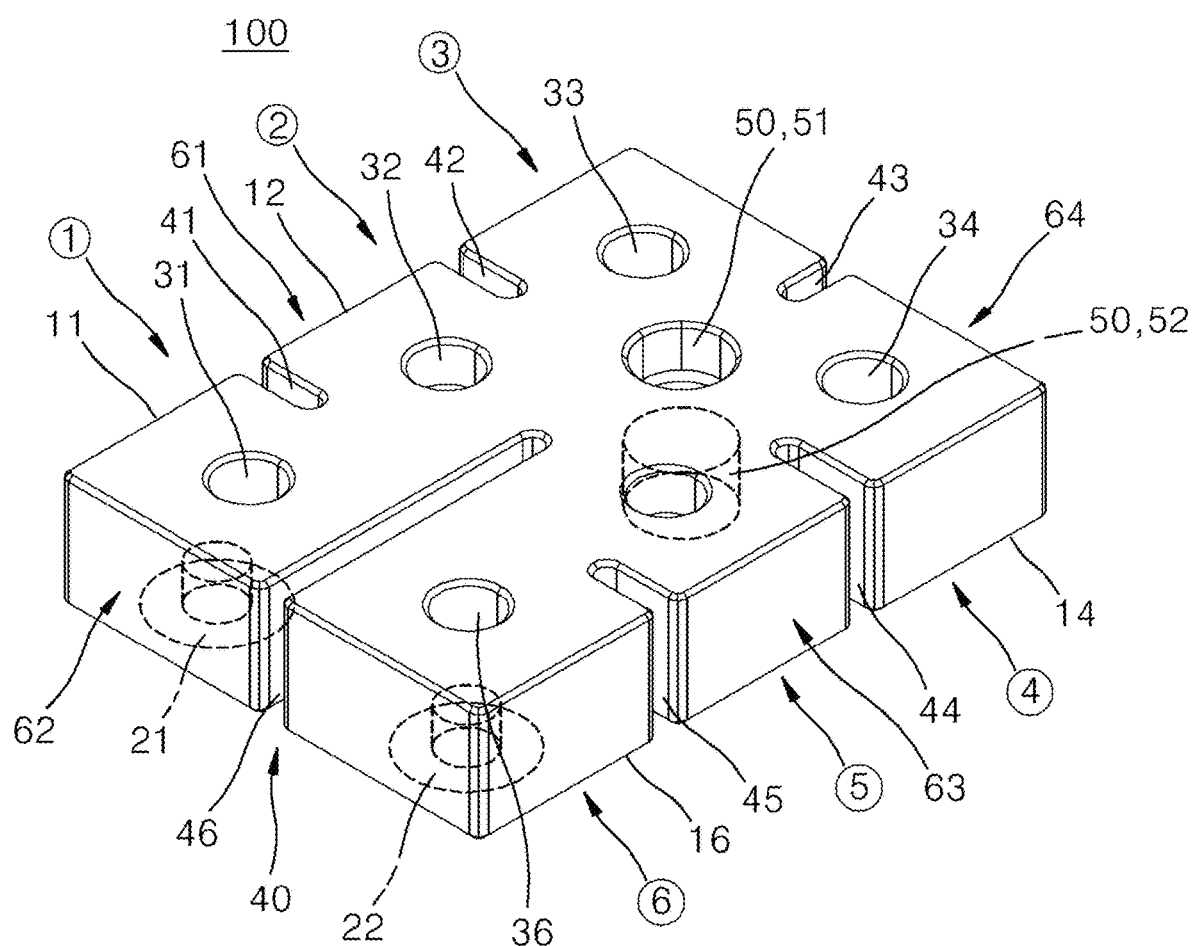
FIG. 1 is a view illustrating a waveguide filter according to a first embodiment of the present disclosure.
Figure 2:
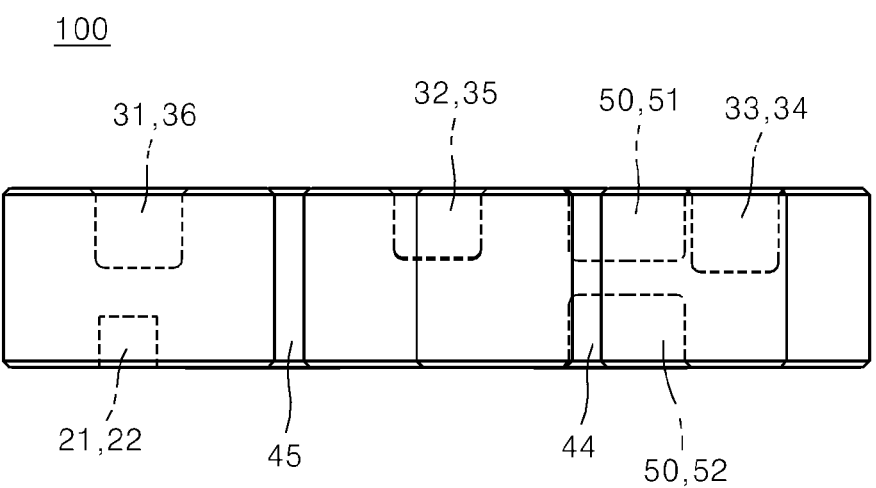
FIG. 2 is a side view of the waveguide filter of FIG. 1.
Figure 3:
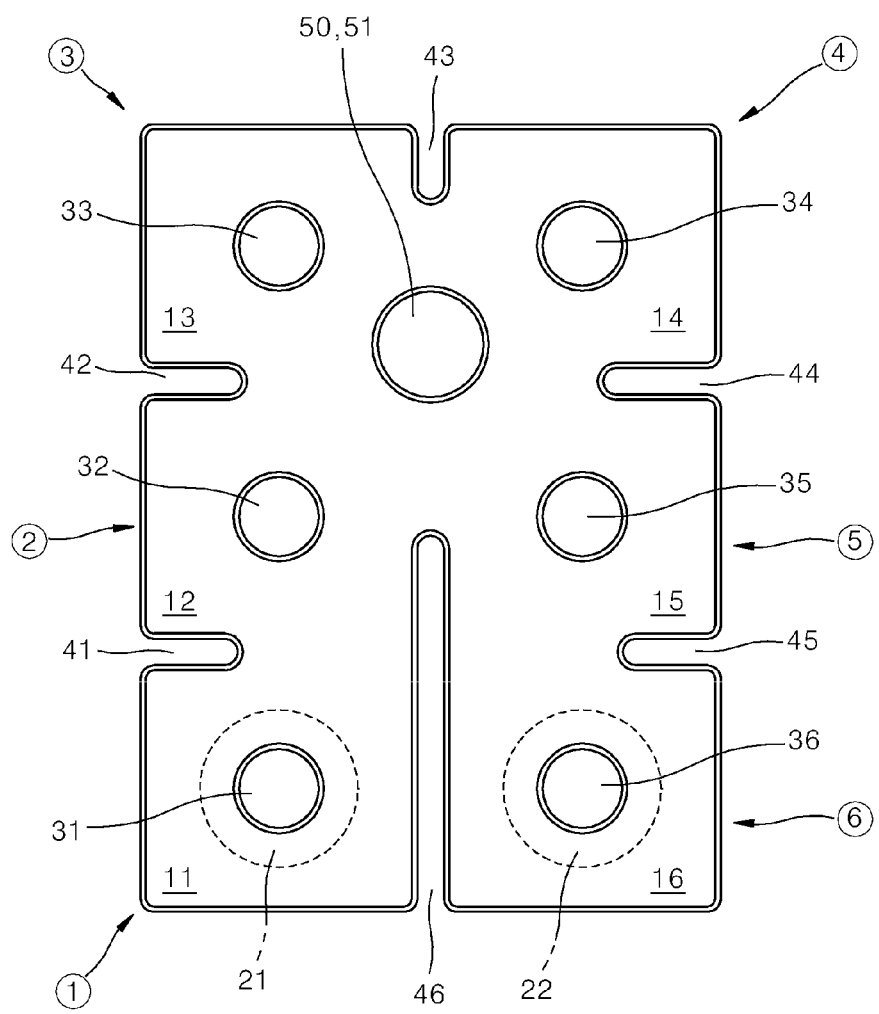
FIG. 3 is a top view of the waveguide filter of FIG. 1.

FIG. 1 is a view illustrating a waveguide filter according to a first embodiment of the present disclosure, and FIG. 2 is a side view of the waveguide filter of FIG. 1. FIG. 3 is a top view of the waveguide filter of FIG. 1.

A communication antenna includes a filter for filtering a signal of a specific passband. A cavity filter, a waveguide filter, or the like may be used as the filter according to characteristics, but in embodiments of the present disclosure, description will be made focused on the waveguide filter provided to the antenna.

As referred to in FIGS. 1 to 3, a waveguide filter 100 according to a first embodiment of the present disclosure includes a plurality of resonance blocks 11 to 16.

The waveguide filter 100 according to the first embodiment includes at least four or more resonance blocks surrounded by multiple, e.g., four side walls 61, 62, 63, 64, and may include, for example, 4 to 20 resonance blocks in one filter. The waveguide filter of the first embodiment of the present disclosure will be described as being made up of six resonance blocks 11 to 16 by way of example.

The waveguide filter 100 according to the first embodiment of the present disclosure may have the plurality of resonance blocks 11 to 16 disposed in one housing 99, and each of the resonance blocks 11 to 16 may be divided by a partition 40 (to be described below).

The inside of each of the resonance blocks 11 to 16 is filled with a dielectric. Ceramic or air may be used as the dielectric material, but another dielectric material may also be used.

Each of the plurality of resonance blocks 11 to 16 may be operated as one resonator, and a waveguide filter made up of four resonators via four resonance blocks may be provided. In the first embodiment of the present disclosure, six resonance blocks 11 to 16 may be provided and operated as six resonators ① to ⑥.

Meanwhile, resonator posts 31 to 36 may be provided to the resonance blocks 11 to 16, respectively. The resonator posts 31 to 36 may be provided to upper or lower end faces of the resonance blocks 11 to 16. When the first resonator post 31 is installed on the upper end face of the first resonance block 11, the other resonator posts 32 to 36 are also preferably installed on the upper end faces of the resonance blocks 12 to 16.

The first to sixth resonance blocks 11 to 16 are coupled with the first to sixth resonator posts 31 to 36, each of which is operated as one resonator. Accordingly, the first to sixth resonators ① to ⑥ of FIG. 6 (to be described below) may be provided. Here, each of the first to sixth resonator posts 31 to 36 may be provided in such a form that the inside thereof is filled with a dielectric including air. When air is a dielectric, the first to sixth resonator posts 31 to 36 are substantially formed as empty spaces. However, in the embodiments of the present disclosure, to prevent confusion of understanding, a physical (or mechanical) term "post" will be used. However, when air is a dielectric, the post will be understood as an "empty space." Likewise, the partition 40 (to be described below) may also be interpreted as the empty space.

Partitions 40 or 41 to 46 may be disposed between the resonance blocks 11 to 16, and sizes and resonance characteristics of the resonance blocks 11 to 16 may vary according to a size (a width or a length) of the partition 40.

For example, the first partition 41 is disposed between the first resonance block 11 and the second resonance block 12. The first resonance block 11 and the second resonance block 12 may be divided on the basis of the first partition 41. Further, the second partition 42 is disposed between the second resonance block 12 and the third resonance block 13. The second resonance block 12 and the third resonance blocks 13 may be divided on the basis of the second partition 42. Further, the third partition 43 is disposed between the third resonance block 13 and the fourth resonance block 14. The third resonance block 13 and the fourth resonance blocks 14 may be divided on the basis of the third partition 43. Further, the fourth partition 44 is disposed between the fourth resonance block 14 and the fifth resonance block 15. The fourth resonance block 14 and the fifth resonance blocks 15 may be divided on the basis of the fourth partition 44. Further, the fifth partition 45 is disposed between the fifth resonance block 15 and the sixth resonance block 16. The fifth resonance block 15 and the sixth resonance blocks 16 may be divided on the basis of the fifth partition 45. Finally, the sixth partition 46 is disposed between the sixth resonance block 16 and the first resonance block 11. The sixth resonance block 16 and the first resonance block 11 may be divided on the basis of the sixth partition 46.

Meanwhile, as referred to in FIGS. 1 to 3, the waveguide filter 100 according to the first embodiment of the present disclosure may include an input post 21 into which a signal is input, and an output post 22 to which a signal is output.

The input post 21 and the output post 22 are disposed on the resonance blocks that are different from each other. Each of the input post 21 and the output post 22 may be installed on any one surface of each of the resonance blocks.

The input post 21 and the output post 22 may be disposed on the resonance blocks (e.g., the first resonance block 11 and the sixth resonance block 16, or the third resonance block 13 and the fourth resonance block 14) of each of opposite ends of the waveguide filter 100. The input post 21 and the output post 22 may be symmetrically installed on the different blocks. For example, as referred to in FIG. 3, the input post 21 may be installed on the first resonance block 11, and the output post 22 may be installed on the sixth resonance block 16.

When an RF signal to be filtered through the input post 21 is input, the input RF signal may be resonated by the first resonator ① of the first resonance block 11, be transmitted, by inductive coupling, to the second resonator ② of the neighboring second resonance block 12 through an open section, and be transmitted to the third resonator ③ of the third resonance block 13, the fourth resonator ④ of the fourth resonance block 14, the fifth resonator ⑤ of the fifth resonance block 15, and the sixth resonator ⑥ of the sixth resonance block 16 by inductive coupling of the open section in order. Then, the RF signal filtered through the output post 22 may be output.

Meanwhile, the waveguide filter 100 according to the first embodiment of the present disclosure may further include a notch post 50 that implements any types of cross coupling between the resonance blocks 11 to 16. Here, as referred to in FIG. 1, the notch post 50 may be disposed on at least one of an upper or lower end face of the housing 99. However, in the first embodiment of the present disclosure, description will be made within the limits of the case where the notch post 50 is disposed on each of the upper and lower end faces of the housing 99.

More specifically, the notch post 50 may be configured such that an upper end post 51 is installed on the upper end face of the notch post 50 among the resonance blocks 11 to 16, and a lower end post 52 is installed on the lower end face of the notch post 50 at a position that corresponds to the upper end face of the notch post 50.

Here, the upper end post 51 may be installed to protrude inward from the upper end face of the housing 99 at a predetermined depth, and the lower end post 52 may be installed to protrude inward from the lower end face of the housing 99 at a predetermined depth at a position facing the upper end post 51. Here, the upper end post 51 and the lower end post 52 may be installed at positions facing each other, but be provided not to be connected to each other. That is, a lower end of the upper end post 51 and an upper end of the lower end post 52 may be spaced apart from each other, wherein the spaced distance may be set to be equal to and more than a setting distance L.

Further, the predetermined depth of the upper end post 51 and the predetermined depth of the lower end post 52 do not need to be identical to each other, and may, as will be described below, be set to be different from each other in order to adjust intensity of capacitive coupling or inductive coupling through the cross coupling.

For example, when a thickness of the entire housing 99 is 6 mm, the setting distance L set as the aforementioned spaced distance is preferably set to be equal to and more than 1.2 mm. In this case, the predetermined depth of the upper end post 51 and the predetermined depth of the lower end post 52 may be distributed and set within a range of 4.8 mm that is obtained by subtracting the above setting distance L of 1.2 mm from 6 mm.

Here, in a state in which the spaced distance between the upper end post 51 and the lower end post 52 is kept equal to and more than the setting distance L, a reciprocal proportion of the predetermined depth of the upper end post and the predetermined depth of the lower end post 52 is adjusted, and the intensity of the capacitive coupling or the inductive coupling which is set depending on the cross coupling can be adjusted.

Thereby, the predetermined depth of the upper end post 51 and the predetermined depth of the lower end post 52 are preferably set to be identical (2.4 mm according to the above).

Further, like the resonator posts 31 to 36, the notch post 50 can also be installed on any one of the upper end face or the lower end face of the housing 99. Thus, the notch post 50 may be installed to protrude inward from the upper end face of the housing 99 or to protrude inward from the lower end face of the housing 99. Even in this case, the notch post 50 does not completely pass through the housing 99 in a thickness direction, and is preferably provided to have a spaced distance as far as the aforementioned setting distance L from the upper or lower end face of the housing 99.

In the waveguide filter 100 having the six resonance blocks 11 to 16, the notch post 50 is installed among the second to fifth resonance blocks 12 to 15. The second to fifth resonance blocks 12 to 15 may be mutually connected and be divided by the partition 40, and particularly the partitions 42 to 44. Here, the notch post 50 may be located adjacent to at least four resonators (second to fifth resonators ② to ⑤) that form inductive coupling in order, and may be located such that inductive coupling can be set by an open section among the plurality of partitions 42 to 44 while being divided by the plurality of partitions 42 to 44.

That is, the notch post 50 may be installed at a central point of the second to fifth resonance blocks 12 to 15, and may implement cross coupling among the resonators ② to ⑤ of the second to fifth resonance blocks 12 to 15.

That is, cross coupling between the second resonance block 12 and the fourth resonance block 14, between the third resonance block 13 and the fifth resonance block 15, and between the second resonance block 12 and the fifth resonance block 15 may be formed by the notch post 50, so that three types of cross coupling can be implemented by the single notch post 50.

In this case, the notch post 50 is configured such that positions of the notches formed on both sides of the passband vary depending on a distance from the partition 40 and distances between the resonator posts 32 to 35. Therefore, the waveguide filter 100 according to the first embodiment of the present disclosure can be subjected to a change in characteristics of the filter according to the position of the notch post 50. If the position of the notch post 50 is changed, the sizes of the resonance blocks 12 to are changed, so that resonance characteristics are changed and thus the position of the notch can be adjusted. This will be described in greater detail below.

Further, the distances between the resonator posts 32 to 35 and the partition 40 vary depending on the shape of the notch post 50, and thus the characteristics of the filter can be changed.

Figure 4:
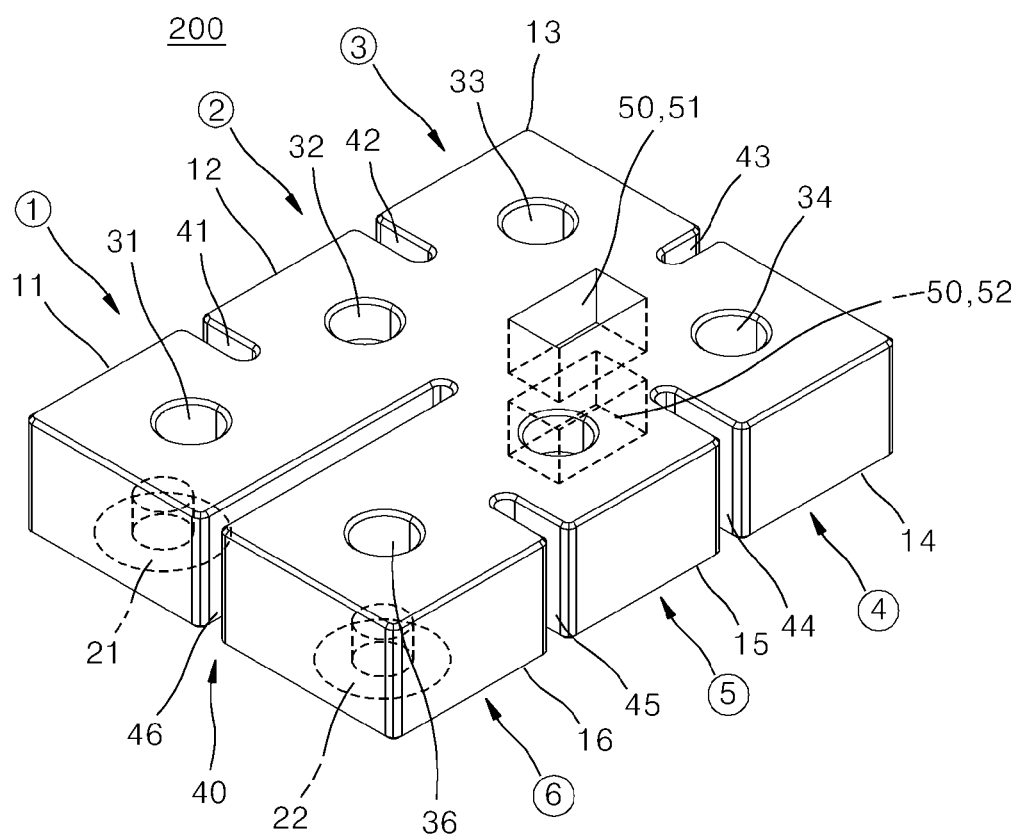
FIG. 4 is a view illustrating a waveguide filter according to a second embodiment of the present disclosure.
Figure 5:
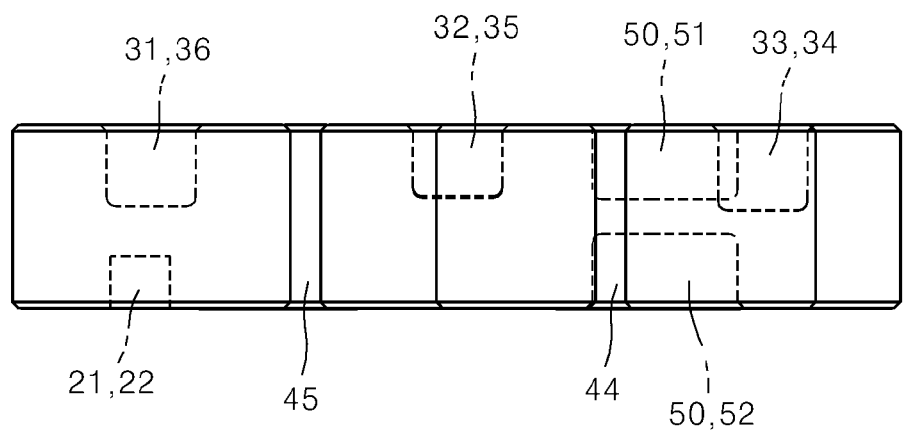
FIG. 5 is a side view of the waveguide filter of FIG. 4.

FIG. 4 is a view illustrating a waveguide filter according to a second embodiment of the present disclosure. FIG. 5 is a side view of the waveguide filter of FIG. 4, and FIG. 6 is a top view of the waveguide filter of FIG. 4.

As referred to in FIGS. 1 to 3, the waveguide filter 100 according to the first embodiment of the present disclosure adopts the notch post 50 formed in the circular post shape. However, the shape of the notch post 50 is not necessarily limited to the circular post shape. That is, the notch post 50 may be formed in a trigonal post shape or a tetragonal post shape in addition to the circular post shape thereof in the first embodiment 100.

Figure 6:
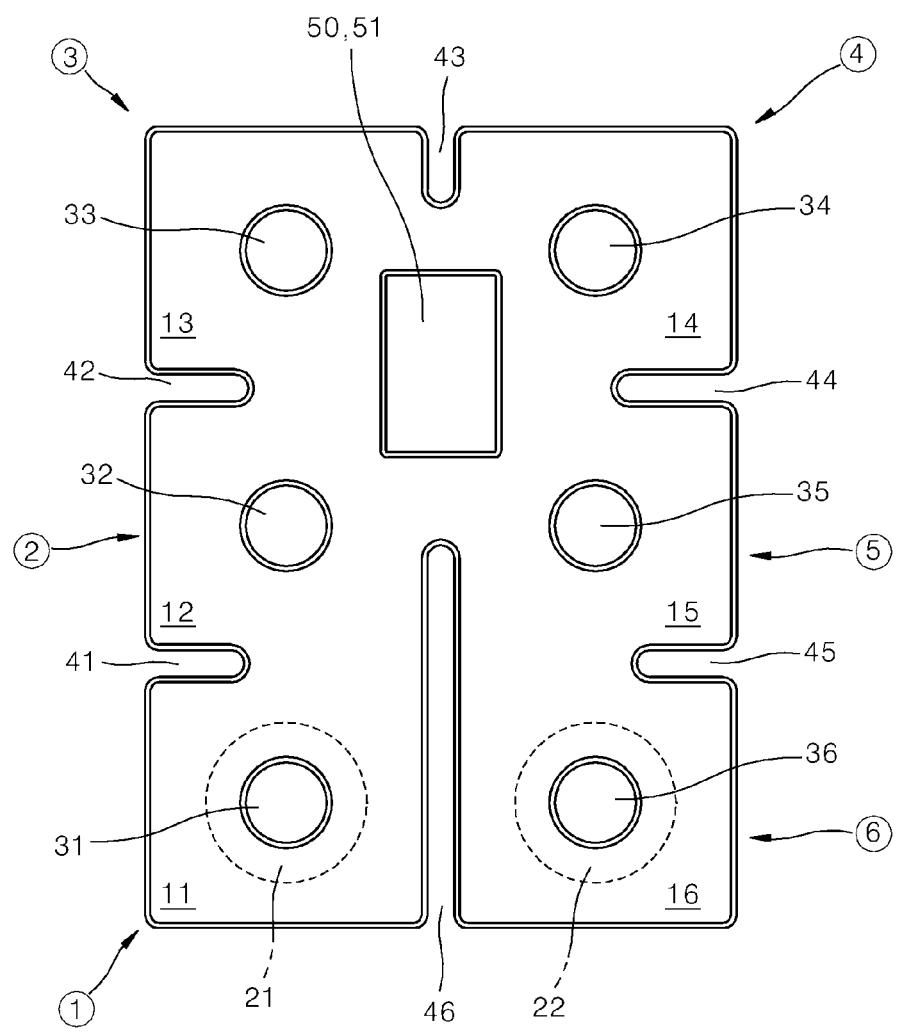
FIG. 6 is a top view of the waveguide filter of FIG. 4.

As referred to in FIGS. 4 to 6, a waveguide filter 200 according to a second embodiment of the present disclosure may be configured such that the notch post 50 is formed among the second to fifth resonance blocks 12 to 15 in a tetragonal post shape.

In comparison with the waveguide filter 100 according to the first embodiment, the waveguide filter 200 according to the second embodiment may be provided such that shapes of the first to sixth resonators ① to ⑥, the first to sixth resonance blocks 11 to 16, and the first to sixth resonator posts 31 to 36 that act as resonators, and shapes of the first to sixth partitions 41 to 46 are all the same, but only a shape of the notch post 50 is made different.

The waveguide filter 200 according to the second embodiment of the present disclosure may also form cross coupling between the second resonance block 12 and the fourth resonance block 14, between the third resonance block 13 and the fifth resonance block 15, and between the second resonance block 12 and the fifth resonance block 15 by the notch post 50, and may naturally implement three types of cross coupling through the single notch post 50.

As described above, the notch post 50 may be formed in a circular post shape (the first embodiment), a trigonal post shape (not illustrated), or a tetragonal post shape (the second embodiment). However, the shape of the notch post 50 is not limited to this, may be formed in any one of N-gonal post shapes such as a pentagonal post shape, a hexagonal post shape, and so on, and be formed in the shape as illustrated in FIG. 9.

Figure 9:
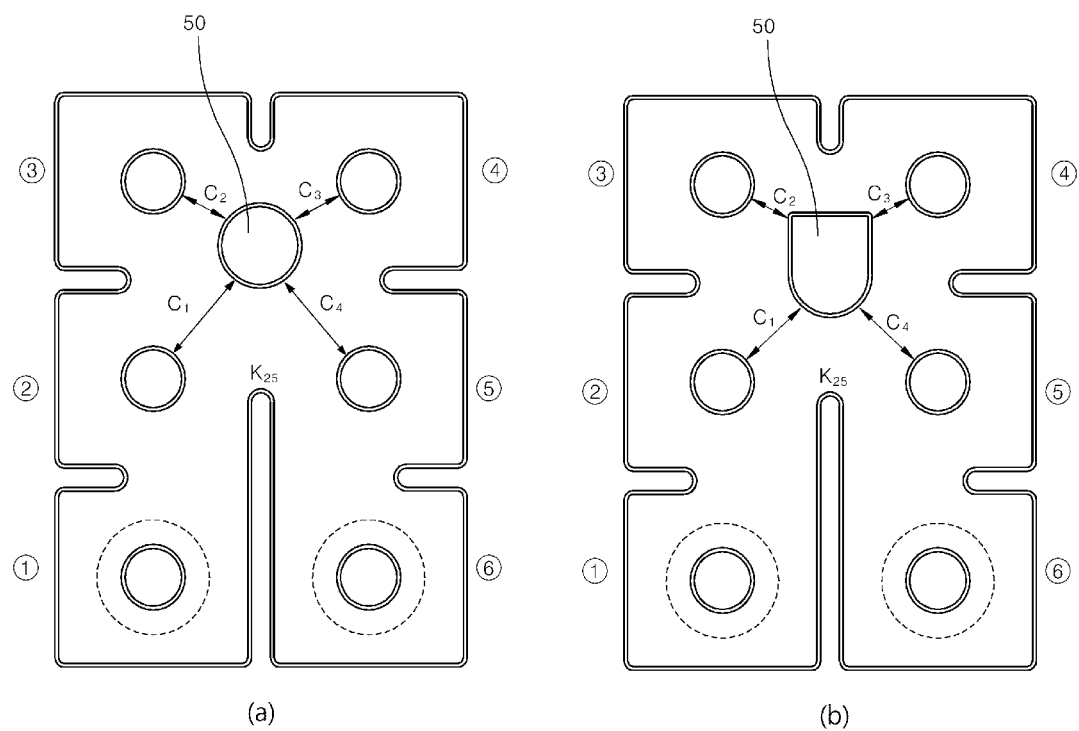
FIG. 9 is a reference view illustrating a change in structure of a notch post of the waveguide filter according to the present disclosure.

That is, when description is made in advance with reference to FIG. 9, the notch post 50 may be configured such that a portion of one side thereof is formed in a curved shape, and a portion of the other side thereof is formed in a tetragonal post shape with predetermined angles. That is, the notch post 50 may be formed in a semi-circular post shape in which a portion of one side of the notch post 50 is formed in a curve, and be formed in a tetragonal post shape at a portion of the other side thereof.

Figure 7:
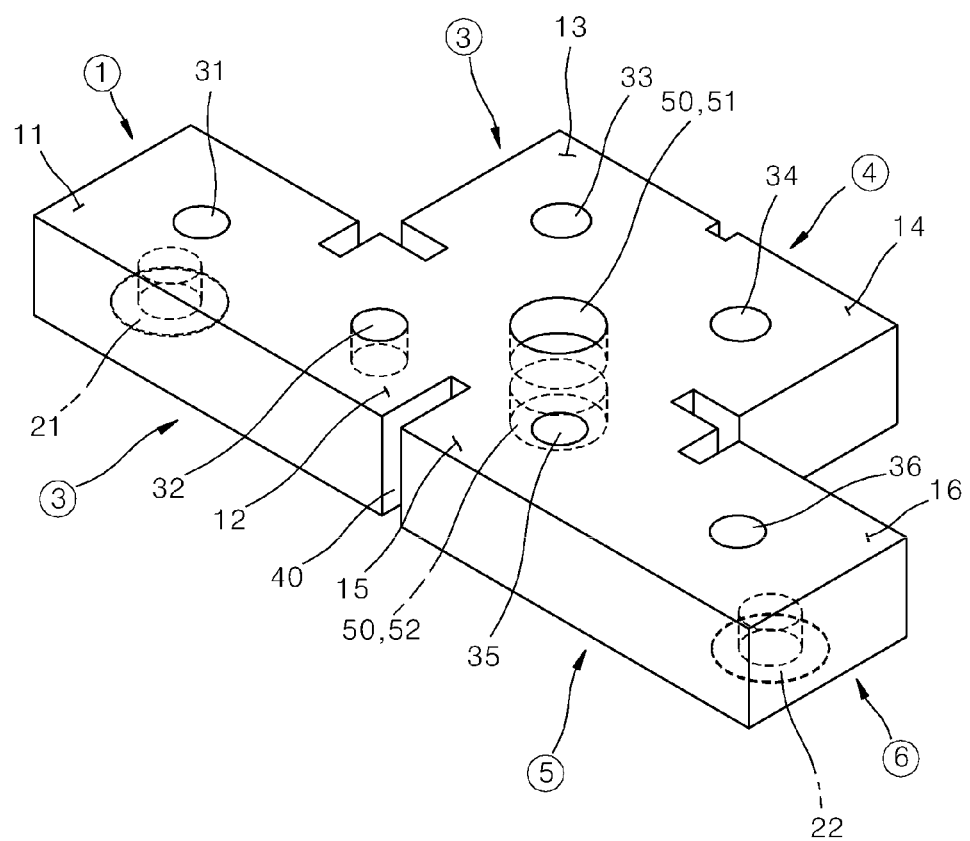
FIG. 7 is a view illustrating a waveguide filter according to a third embodiment of the present disclosure.
Figure 8:
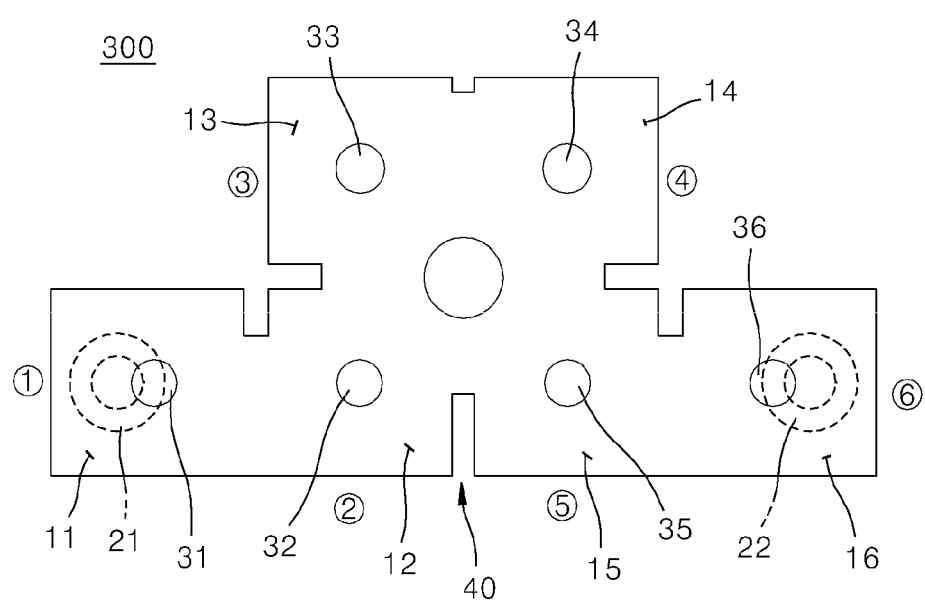
FIG. 8 is a top view of the waveguide filter of FIG. 7.

FIG. 7 is a view illustrating a waveguide filter according to a third embodiment of the present disclosure, and FIG. 8 is a top view of the waveguide filter of FIG. 7.

As referred to in FIGS. 7 and 8, a waveguide filter 300 according to a third embodiment of the present disclosure may be changed in the entire appearance shape thereof, compared to the aforementioned first embodiment 100. The waveguide filter 300 according to the third embodiment of the present disclosure will be described as being made up of six resonance blocks 11 to 16 by way of example. The same terms and reference signs may be used for the identical components as in the first embodiment 100.

The waveguide filter 300 according to the third embodiment of the present disclosure may be implemented by a shape different from but identical to characteristics as in the waveguide filter 100 according to the first embodiment with reference to FIGS. 1 to 3.

That is, the waveguide filter 300 according to the third embodiment is configured such that positions of the first resonance block 11 and the sixth resonance block 16, at which an input post 21 and an output post 22 are located, are different but the second to fifth resonance blocks 12 to are the same as in the first embodiment 100 described above. Thereby, the filter having a different shape and the same frequency characteristics can be implemented.

As a result, the waveguide filter 100 can be configured such that the shape thereof, i.e., a shape based on connection of the resonance blocks 11 to 16, is changed.

FIG. 9 is a reference view illustrating a change in structure of the notch post of the waveguide filter according to the present disclosure.

As referred to in FIG. 9, the notch post 50 may set mutual coupling for the resonators ② to ⑤ of the neighboring resonance blocks 12 to 15.

The notch post 50 may have a total of three types of cross coupling set for the second to fifth resonators ② to ⑤ of the neighboring resonance blocks, namely the second to fifth resonance blocks 12 to 15. Specifically, cross coupling (hereinafter referred to as "K24") between the second resonance block 12 and the fourth resonance block 14, cross coupling (hereinafter referred to as "K35") between the third resonance block 13 and the fifth resonance block 15, and cross coupling (hereinafter referred to as "K25") between the second resonance block 12 and the fifth resonance block 15 may be formed, and the three types of cross coupling K24, K35, and K25 may be implemented through the single notch post 50.

First, characteristics of the waveguide filter 100 according to the embodiments of the present disclosure may be changed because a distance between the resonator posts of the neighboring resonance blocks is changed when a position of the notch post 50 is changed. That is, the notch post 50 may be configured such that inductive coupling or capacitive coupling, which is previously formed between the neighboring resonators by performing cross coupling is changed and set depending on a change in distances from the resonance blocks 12 to 15 provided to the plurality of resonators ② to ⑤.

Here, when a position of the notch post 50 is changed, a distance from the partition 40 provided between the resonance blocks is also changed, and thus whole characteristics of the waveguide filter 100 are changed.

Meanwhile, characteristics of the waveguide filter 100 may be changed depending on the form or shape of the notch post 50.

In this way, the waveguide filter 100 may be configured such that, due to the position or the form (shape) of the notch post 50, the cross coupling between the resonators of the neighboring resonance blocks, namely the second to fifth resonance blocks 12 to 15, acts as the inductive coupling or the capacitive coupling.

Thus, due to a change in position or form of the notch post 50, intensity of the cross coupling is changed depending on mutual intervals between the resonator posts 32 to 35 of the resonance blocks 12 to 15 and the notch post 50, and thus a length of the partition 40 provided between the filter resonators may be changed in design so as to be fitted thereto.

In the waveguide filter 100 according to the embodiments of the present disclosure, the intensity of the cross coupling between the resonators is changed by distances C1 to C4 between the notch post 50 and the resonators.

That is, in the waveguide filter 100 according to the embodiments of the present disclosure, as referred to in FIG. 9A, when the position of the notch post 50 is changed toward the third resonator ③ and the fourth resonator ④, the distances between the notch post 50 and the resonator posts 32 and 35, namely distances of C1 and C4, become distant, so that intensity of coupling between the second resonator ② and the fourth resonator ④ and intensity of coupling between the third resonator ③ and the fifth resonator ⑤ can be weakened. In this case, depending on a change in intensity, a coupling structure between the third resonator ③ and the fifth resonator ⑤ can be changed from first inductive coupling L to capacitive coupling C, or from first capacitive coupling C to inductive coupling L.

Further, as referred to in FIG. 9B, when the shape of the notch post 50 is subjected to rounding on one side thereof, namely has a curved shape toward the second resonator ② and the fifth resonator ⑤ and a tetragonal shape having corners toward the third resonator ③ and the fourth resonator ④, distances from the second resonator ② and the fifth resonator ⑤ are increased. In this way, when the distances from the notch post 50 and the resonator posts ② and ⑤ are increased, intensity of the coupling for the corresponding direction is reduced, whereas when the distances from the notch post 50 and the resonator posts ② and ⑤ are increased, the intensity of the coupling for the corresponding direction is increased.

Figure 10:
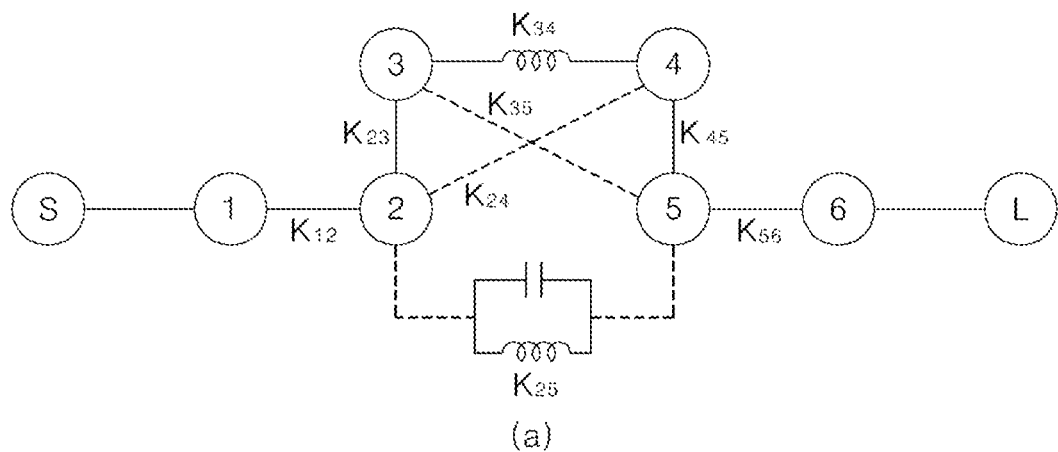
FIG. 10 is a reference view illustrating cross coupling of the waveguide filter according to the present disclosure.
Figure 10:
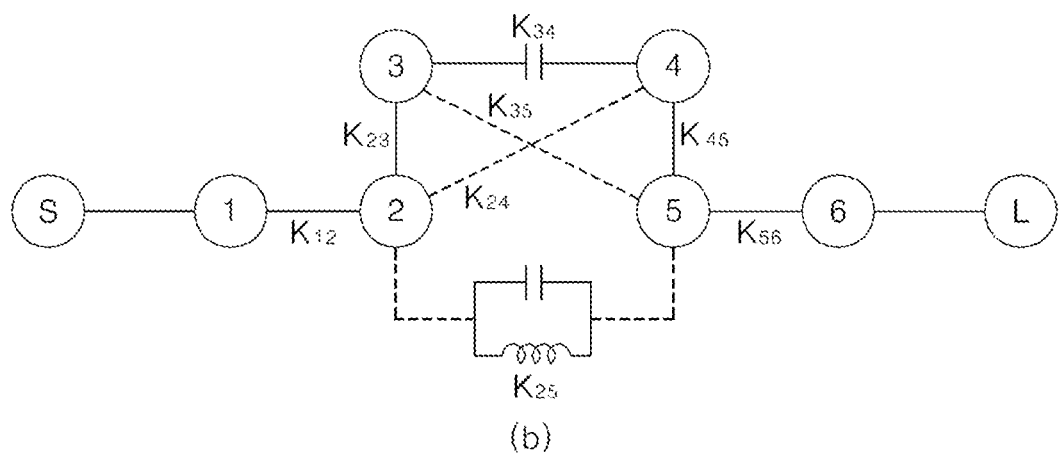

FIG. 10 is a reference view illustrating cross coupling in the waveguide filters 100 to 300 according to the present disclosure.

As illustrated in FIG. 10A, the first to sixth resonance blocks 11 to 16 between a signal input S and a signal output L act as the resonators ① to ⑥, and the notch post 50 is located among the second to fifth resonance blocks 12 to 15, so that cross coupling can be formed among the neighboring second to fifth resonators ② to ⑤.

According to connections of the resonance blocks 12 to 15 associated with the waveguide filters 100 to 300, main types of coupling K12, K23, K34 K45, and K56 (which are typically called "neighboring types of coupling") may be formed.

Further, in the waveguide filters 100 to 300, due to the notch post 50, the cross coupling of the coupling K24 may be formed between the second resonator ② and the fourth resonator ④ and the cross coupling of the coupling K35 may be formed between the third resonator ③ and the fifth resonator ⑤. In addition, the cross coupling of the coupling K25 may be formed between the second resonator ② and the fifth resonator ⑤.

In the waveguide filters 100 to 300, according to a position or a form (shape) of the notch post 50, the cross coupling between the resonators ② to ⑤ of the neighboring resonance blocks 12 to 15 serves as inductive coupling or capacitive coupling.

The cross coupling between the second resonator ② and the fifth resonator ⑤ may be operated as inductive coupling and capacitive coupling.

In FIG. 9 described above, when the notch post 50 moves toward the third resonance block 13 and the fourth resonance block 14, namely moves upward, a distance between the third resonance block 13 and the fourth resonance block 14 is reduced, and a distance between the second resonance block 12 and the fifth resonance block 15 is increased.

Meanwhile, as referred to in FIG. 9A, when the notch post 50 is dislocated to any side, the inductive coupling K34 between the third resonator ③ and the fourth resonator ④ adjacent to each other may be changed to the capacitive coupling as in FIG. 10B, or the capacitive coupling between the third resonator ③ and the fourth resonator ④ may be changed to the inductive coupling K34 as in FIG. 10A.

For example, when the notch post 50 is dislocated toward the third resonator ③ and the fourth resonator ④, distances of C1 and C4 are increased. Finally, intensity of K24 and intensity of K35 may be weakened, and the coupling structure of K34 may be changed from inductive L to capacitive coupling C. In this case, in the filters, a notch may be formed on the left side of the passband.

In the contrary case, namely when the notch post 50 is dislocated in a direction away from C1 and C4, characteristics of the cross coupling are changed from the capacitive coupling to the inductive coupling, and thus a notch located on the left side moves to the right side.

Here, when the notch post 50 is dislocated toward the third resonator ③ and the fourth resonator ④, the coupling structure of K34 is changed from the inductive coupling L to the capacitive coupling C, of which description has been made by way of example. However, the coupling structure of K34 may be changed from the capacitive coupling C to the inductive coupling L, which has been described above.

Whether the initial coupling K34 between the third resonator ③ and the fourth resonator ④ adjacent to each other in a state in which the notch post 50 is not installed is the inductive coupling or the capacitive coupling may be determined depending on a size or an installation position of each of the resonator posts, or a size or an installation position of the partition between the resonance blocks.

Meanwhile, when the form of the notch post 50 is a trigonal shape, two corners of the notch post are disposed adjacent to the third resonator ③ and the fourth resonator ④, and even in this case, similar results may be obtained.

Further, when the notch post 50 is designed such small that the cross coupling K24 between the second resonator ② and the fourth resonator ④ and the cross coupling K35 between the third resonator ③ and the fifth resonator ⑤ are not formed, it is a little more simplified in view of a circuit. However, in comparison with that the cross coupling K25 between the second resonator ② and the fifth resonator ⑤ and the cross coupling K35 between the third resonator ③ and the fifth resonator ⑤ are implemented, a degree of freedom for notch positioning may be slightly reduced.

Figure 11:
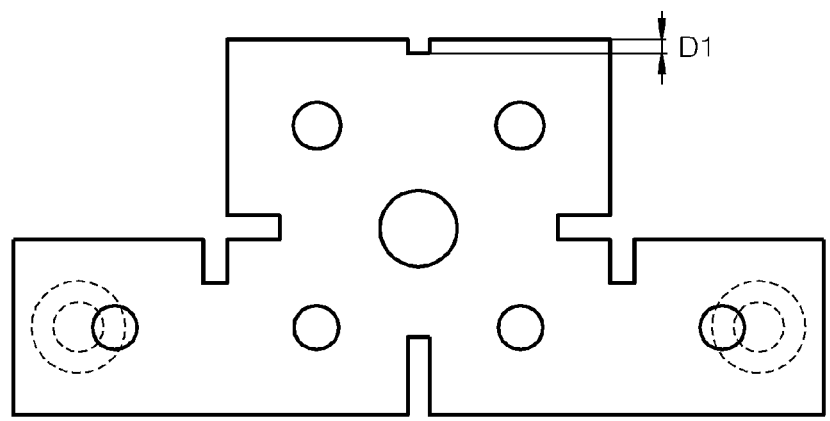
FIG. 11 is a top view of the waveguide filter according to the third embodiment of the present disclosure, and especially a reference view illustrating a structural change of a partition.
Figure 11:
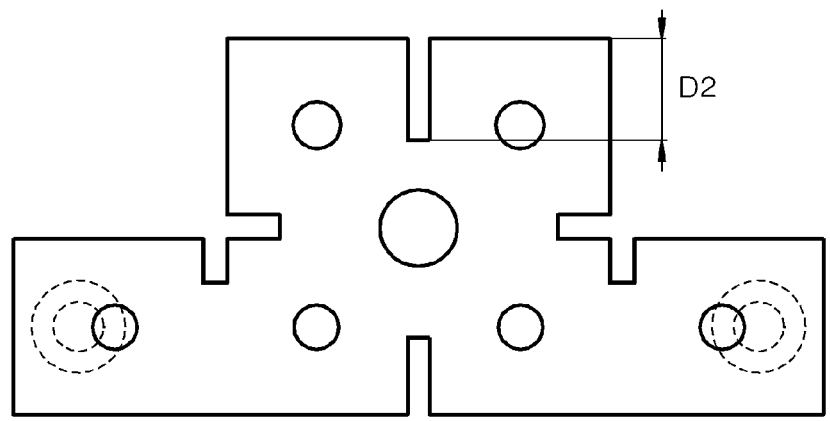

FIG. 11 is a top view of the waveguide filter according to the third embodiment of the present disclosure, and especially a reference view illustrating a structural change of the partition.

Referring to FIG. 11, the waveguide filter 300 according to the third embodiment of the present disclosure may be subjected to a change in characteristic depending on a position and size of the partition 40. The resonance blocks 11 to 16 may be changed in size according to the position of the partition 40, and the intensity of the cross coupling between the resonators ② to ⑤ of the resonance blocks 12 to 15 may be changed according to the size of the partition 40.

That is, as referred to in FIGS. 11A and 11B, when a length of the partition 40 between the third resonator ③ and the fourth resonator ④ is increased from a first length D1 to a second length D2, the intensity of the cross coupling may be changed.

Therefore, by changing the length of the partition 40, three types of cross coupling within the second to fifth resonance blocks 12 to 15 may be adjusted to increase the intensity of any one of the two types of cross coupling and to reduce the intensity of the other type of cross coupling.

Likewise, although not illustrated in the drawings, in the waveguide filter 300 according to the embodiment of the present disclosure, when the position of the notch post 50 is changed, distances from the resonator posts 32 to 35 are changed, and thus the intensity of the cross coupling may be adjusted therethrough.

Therefore, a size of specific coupling is increased depending on the characteristics of the filter, and thereby a notch position of the passband can be adjusted.

Figure 12:
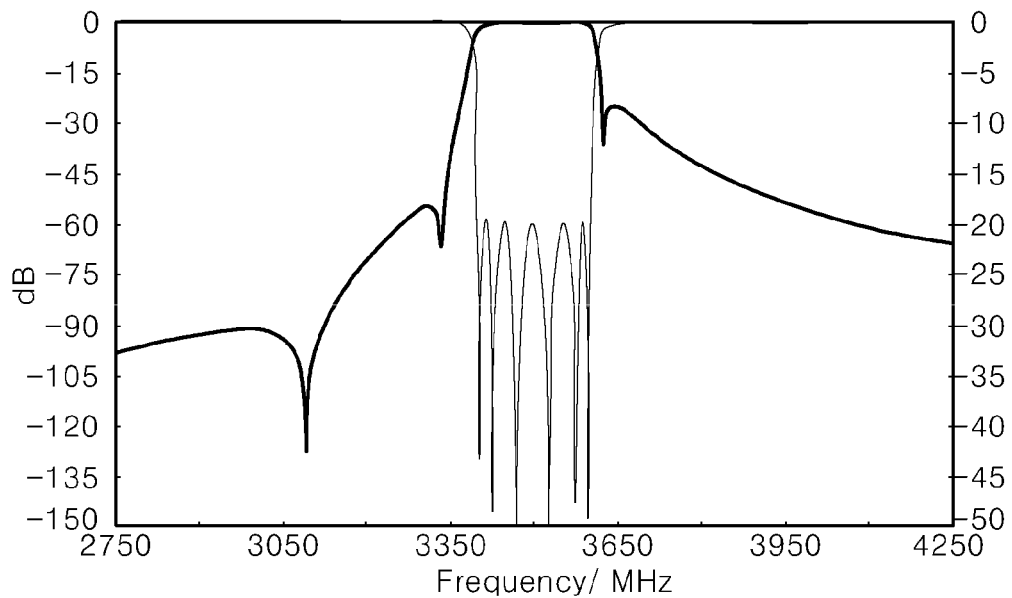
FIGS. 12 to 14 are graphs showing filter characteristics of the waveguide filter according to the present disclosure.
Figure 13:
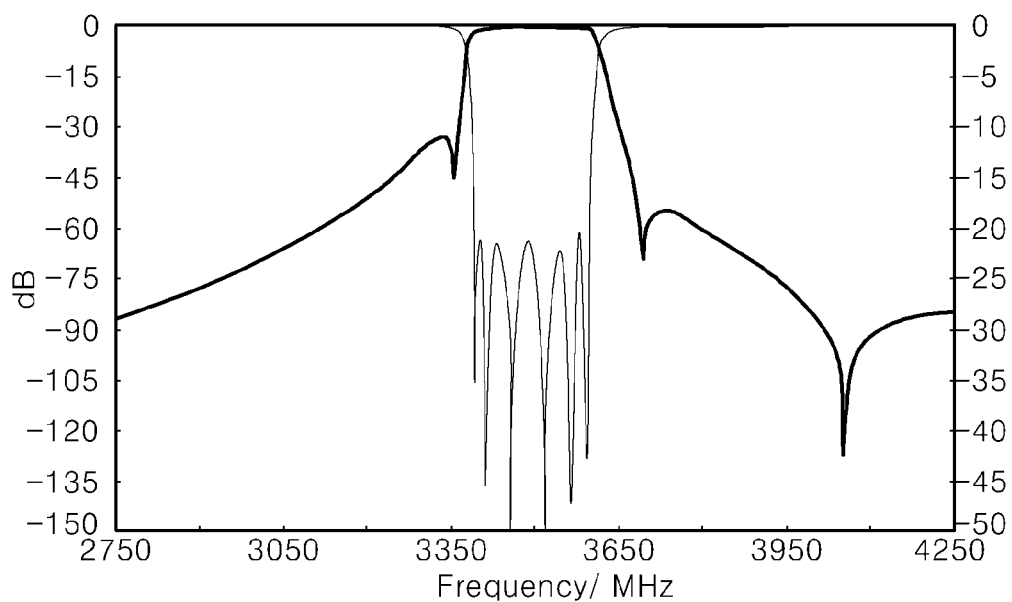
Figure 14:
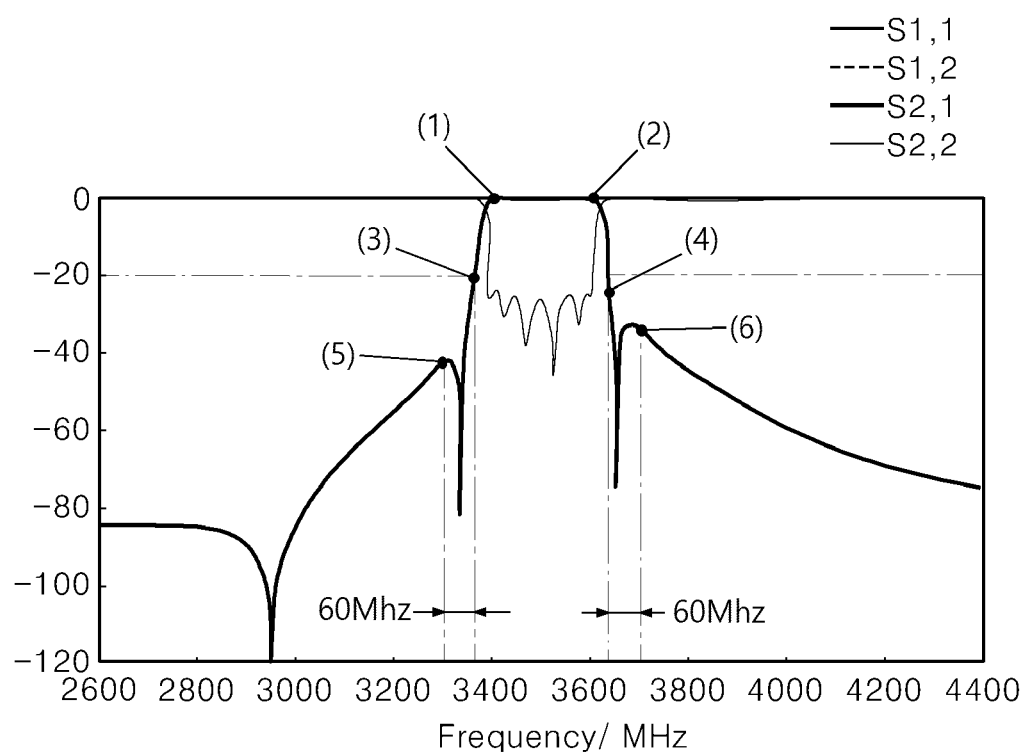

FIGS. 12 to 14 are graphs illustrating characteristics of the waveguide filter according to the present disclosure. The transverse axis indicates a frequency, and the longitudinal axis indicates cutoff performance DB of the filter.

In the waveguide filter 100, signal characteristics may be formed as a notch on both sides of a passband, and characteristics of the cross coupling may be formed as capacitive coupling or inductive coupling.

As referred to in FIG. 12, in the waveguide filter 100, two notches may be formed on the left side of a passband through cross coupling.

In the second to fifth resonators ② to ⑤ according to a position of the notch post 50, as referred to in FIG. 9 described above, when the notch post 50 is installed at a position dislocated toward the third resonator ③ and the fourth resonator ④, the coupling between the third resonator ③ and the fourth resonator ④ serves as capacitive coupling C, and thus two notches may be formed on the left side of a passband.

As referred to in FIG. 11A described above, although the notch post 50 is located in the center with respect to the second to fifth resonators ② to ⑤, when a length of the partition 40 between the third resonator ③ and the fourth resonator ④ is short, the coupling between the third resonator ③ and the fourth resonator ④ is, as referred to in FIG. 13, operated as inductive coupling L, and thus two notches may be formed on the right side of a passband. Further, as referred to in FIG. 11B, when the length of the partition 40 is long, desired performance can be obtained by adjusting intensity of the two notches formed on the right side.

Meanwhile, when the notch post 50 is provided in a tetragonal post shape as in the waveguide filter 200 according to the second embodiment, a transverse or longitudinal length of the notch post 50 is precisely changed compared to the waveguide filter 100 according to the first embodiment in which the notch post 50 is provided in a circular post shape, and thereby there is an effect that coupling characteristics are easily adjusted. That is, as referred to in FIG. 13, as in the first embodiment 100 or the third embodiment 300 before the position of the notch post 50 is changed or before the form (or the shape) of the notch post 50 is changed, two notches are formed on the right side of the passband, but it can be found that relatively greater cutoff performance DB of the notch is obtained.

In this way, in the waveguide filters 100 to 300 according to the embodiments of the present disclosure, various shapes of notches can be freely formed on a lower side, upper side, left side, and right side of the passband of the filter using the form (shape) and position of the notch post 50 and a change of the partition 40.

For example, as referred to in FIG. 14, requirements of the passband that is set to 3400 Mhz to 3600 Mhz are as follows.

First, the cutoff performance DB required to secure performance of a band pass filter has to satisfy 0 to 2 dB. Further, the cutoff performance DB required in the left section of the passband of the band pass filter (e.g., within a range of 60 Mhz that is a low-band contiguous section) and the right section of the passband of the band pass filter (e.g., within a range of 60 Mhz that is a high-band contiguous section) has to satisfy −20 dB or lower. Of course, frequency ranges of the low-band and high-band contiguous sections may be variously changed depending on a designer.

In this case, referring to FIG. 14, the passband of the band pass filter which is within a range of 0 to 20 dB that is required cutoff performance may be indicated as a section between (1) and (2), required cutoff performance of the left section of the passband may be indicated as a notch section between an arbitrary position (3) of −20 dB or lower and a point (5) within the range of 60 Mhz, and required cutoff performance of the right section of the passband may be indicated as a notch section between an arbitrary position (4) of −20 dB or lower and a point (6) within the range of 60 Mhz.

That is, FIG. 14 is a graph indicating a state in which all the above requirements are satisfied. When requirements capable of outputting this graph as a result of implementing the inductive coupling and the cross coupling using the waveguide filters 100 to 300 according to the embodiments of the present disclosure are not satisfied, desired filter performance can be secured by attempting to adjust the position and form of the notch post 50 and the length of the partition 40. Accordingly, the waveguide filters 100 to 300 according to the embodiments of the present disclosure can implement performance of various filters, and increase productivity by simplifying complexity of the filter and manufacturing costs of the filter.

Although all the components constituting each embodiment of the present disclosure have been described as being combined in a single unit and operated as such, the present disclosure is not necessarily limited to these embodiments. Depending on the embodiments, all the components may also be selectively combined and operated with each other as one or more components without departing from the scope of the present disclosure.

The aforementioned description is merely illustrative of the technical spirit of the present disclosure, and can be variously corrected and modified by those having ordinary skill in the technical field to which the present disclosure pertains without departing from the essential characteristics of the present disclosure.

INDUSTRIAL APPLICABILITY

The present disclosure provides a waveguide filter in which characteristics of a specific passband are enhanced through cross coupling using resonators.

What is claimed is:

1. A waveguide filter, comprising:
   a housing defining an internal space of the waveguide filter, wherein the internal space contains a plurality of resonance blocks, wherein the housing comprises an upper plate, a lower plate and side walls surrounding the plurality of resonance blocks;
   a plurality of resonators each of which is formed by a resonator post installed on a respective one of the plurality of resonance blocks;
   a plurality of partitions, wherein each of the plurality of partitions is formed at a boundary of two adjacent resonance blocks of the plurality of resonance blocks to protrude from one of the side walls into the waveguide filter; and
   an upper notch post formed to protrude from the upper plate downward into the internal space of the waveguide filter,
   wherein at least one of the plurality of partitions passes over a line connecting centers of two adjacent resonators of the plurality of resonators into the internal space.

2. The waveguide filter according to claim 1, wherein the plurality of resonators comprise at least four resonators which form inductive coupling in order, and the plurality of resonators are located to enable the inductive coupling to be set by an open section between the plurality of partitions while being divided by the plurality of partitions.

3. The waveguide filter according to claim 2, wherein the upper notch post and a lower notch post have three types of cross coupling formed for the at least four resonators.

4. The waveguide filter according to claim 1, wherein the plurality of partitions define a size of each of the plurality of resonance blocks depending on a respective position thereof.

5. The waveguide filter according to claim 1, wherein the upper notch post has one portion formed in a semi-circular post having a curve and has another portion formed in a tetragonal post.

6. The waveguide filter according to claim 1, wherein the upper notch post is configured to form capacitive coupling between at least two of the plurality of resonators installed adjacent to each other.

7. The waveguide filter according to claim 1, further comprising:
   a lower notch post installed adjacent to the plurality of resonators, wherein the lower notch post is formed to protrude from the lower plate upward into the internal space of the waveguide filter, and
   wherein the lower notch post is configured to increase intensity of cross coupling for at least one of the plurality of resonators.

8. The waveguide filter according to claim 1, wherein the upper notch post is installed at a central point of at least four resonance blocks of the plurality of resonance blocks, and implements cross coupling among the resonators of the at least four resonance blocks.

9. The waveguide filter according to claim 8, wherein the upper notch post forms cross coupling between a second resonance block and a fourth resonance block, between a third resonance block and a fifth resonance block, and between the second resonance block and the fifth resonance block, thereby implementing three types of cross coupling through the single upper notch post.

10. The waveguide filter according to claim 7, wherein a predetermined depth of the upper notch post and a predetermined depth of the lower notch post are set to be different from each other in order to adjust intensity of capacitive coupling or inductive coupling through cross coupling.

11. The waveguide filter according to claim 1, wherein the waveguide filter is configured to adjust a position of a notch by changing a position of the upper notch post, whereby the sizes of resonance blocks are changed and resonance characteristics are changed.

12. The waveguide filter according to claim 1, wherein the waveguide filter is configured to form at least one notch on at least one of a left side or a right side of a passband of the waveguide filter using a form and a position of the upper notch post.

13. A waveguide filter, comprising:
    a housing defining an internal space of the waveguide filter, wherein the internal space contains a plurality of resonance blocks, wherein the housing comprises an upper plate, a lower plate and side walls surrounding the plurality of resonance blocks;
    a plurality of resonators each of which is formed by a resonator post installed on a respective one of the plurality of resonance blocks;
    a plurality of partitions, wherein each of the plurality of partitions is formed at a boundary of two adjacent resonance blocks of the plurality of resonance blocks to protrude from one of the side walls into the waveguide filter;
    an upper notch post formed to protrude from the upper plate downward into the internal space of the waveguide filter, wherein at least one of the plurality of partitions passes through between two adjacent resonators of the plurality of resonators into the internal space; and
    a lower notch post installed adjacent to the plurality of resonators, wherein the lower notch post is formed to protrude from the lower plate upward into the internal space of the waveguide filter.

14. The waveguide filter according to claim 13, wherein the lower notch post is formed at a position corresponding to the upper notch post.

15. The waveguide filter according to claim 13, wherein the upper notch post and the lower notch post are subjected to a change in intensity of cross coupling between the plurality of resonators depending on a position or a form thereof.

16. The waveguide filter according to claim 13, wherein the upper notch post and the lower notch post are configured such that characteristics of cross coupling between the plurality of resonators are set to inductive coupling or capacitive coupling depending on distances from the resonator posts provided to the plurality of resonators.

17. The waveguide filter according to claim 13, further comprising:
   another upper notch post protruding from the upper plate downward into the internal space of the waveguide filter, and another lower notch post protruding from the lower plate upward into the internal space of the waveguide filter, wherein the another upper notch post is provided at a position not corresponding to a position at which the another lower notch post is provided.

18. The waveguide filter according to claim 13, wherein the upper notch post and the lower notch post are configured such that a distance between a bottom of the upper post and a top of the lower post is set to be equal to or greater than a setting distance.

19. The waveguide filter according to claim 13, wherein the upper notch post and the lower notch post are configured such that a reciprocal proportion of a predetermined depth of the upper post and a predetermined depth of the lower post is adjusted in a state in which a spaced distance between the upper post and the lower post is kept equal to or greater than a setting distance, and an intensity of the capacitive coupling or the inductive coupling which is set depending on cross coupling is adjusted.

20. The waveguide filter according to claim 13, wherein the upper notch post and the lower notch post are formed in a form of any one of a circular post, a trigonal post, a tetragonal post, and another N-gonal post.

* * * * *